(12) United States Patent
Zeng et al.

(10) Patent No.: US 10,416,994 B2
(45) Date of Patent: Sep. 17, 2019

(54) CONTROL METHOD

(71) Applicant: Lenovo (Beijing) Co., Ltd., Beijing (CN)

(72) Inventors: Rong Zeng, Beijing (CN); Can Wang, Beijing (CN); Rongfeng Feng, Beijing (CN); Qixin Xing, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/871,915

(22) Filed: Jan. 15, 2018

(65) Prior Publication Data

US 2018/0285098 A1    Oct. 4, 2018

(30) Foreign Application Priority Data

Mar. 31, 2017    (CN) .......................... 2017 1 0210445

(51) Int. Cl.
| | | |
|---|---|---|
| *G06F 8/70* | (2018.01) | |
| *G06F 8/38* | (2018.01) | |
| *G06F 9/46* | (2006.01) | |

(52) U.S. Cl.
CPC .................. *G06F 8/70* (2013.01); *G06F 8/38* (2013.01); *G06F 9/46* (2013.01)

(58) Field of Classification Search
None
See application file for complete search history.

(56) References Cited

U.S. PATENT DOCUMENTS

| | | | | |
|---|---|---|---|---|
| 6,006,323 | A * | 12/1999 | Ma ....................... | G06F 9/30101 712/202 |
| 7,260,845 | B2 * | 8/2007 | Kedma ................... | G06F 9/468 713/166 |
| 8,286,174 | B1 * | 10/2012 | Schmidt ................ | G06F 9/5077 709/226 |
| 9,485,310 | B1 * | 11/2016 | Bono .................. | H04L 67/1097 |
| 9,875,137 | B2 * | 1/2018 | Kumaresan ............. | G06F 9/485 |
| 2002/0012329 | A1 * | 1/2002 | Atkinson .............. | G06F 9/4411 370/330 |
| 2009/0064108 | A1 * | 3/2009 | De Atley ............ | G06F 9/44505 717/121 |
| 2011/0296351 | A1 * | 12/2011 | Ewing, Jr. ............. | G06F 3/0346 715/841 |
| 2012/0081319 | A1 * | 4/2012 | Gimpl ................... | G06F 1/1616 345/173 |
| 2012/0185874 | A1 * | 7/2012 | Cookson ............... | G06F 9/4843 719/313 |
| 2013/0152078 | A1 * | 6/2013 | Arcilla ....................... | G06F 8/60 718/1 |
| 2014/0040656 | A1 * | 2/2014 | Ho ........................ | G06F 9/5077 714/3 |
| 2014/0196022 | A1 * | 7/2014 | Skutin ....................... | G06F 8/61 717/176 |
| 2015/0317721 | A1 * | 11/2015 | T J .......................... | G06Q 30/06 715/835 |

\* cited by examiner

*Primary Examiner* — Hossain M Morshed
(74) *Attorney, Agent, or Firm* — Anova Law Group, PLLC (57) ABSTRACT

A control method includes building at least two stacks for an app, and managing the Activity components based on the at least two stacks.

20 Claims, 7 Drawing Sheets

CONTROL METHOD

CROSS-REFERENCE TO RELATED APPLICATION

This application claims priority to Chinese Application No. 201710210445.6, filed on Mar. 31, 2017, the entire contents of which are incorporated herein by reference.

FIELD OF THE DISCLOSURE

The present disclosure generally relates to the field of electronic device application management technology and, more particularly, to a control method and an electronic device using the same.

BACKGROUND

The current social applications (apps) generally have the chatting function, the article usage function (e.g., reading, or sharing), and other functions.

However, most of the existing social apps cannot open the article interface and the chatting interface at the same time. Therefore, the user cannot chat while reading an article, which affects the friendliness of the apps.

SUMMARY

One aspect of the present disclosure provides a control method, including building at least two stacks for an app, and managing Activity components based on the at least two stacks.

Another aspect of the present disclosure provides an electronic device including a memory storing a computer program and a processor coupled to the memory. The processor executes the computer program to build at least two stacks for an app and manage Activity components based on the at least two stacks.

BRIEF DESCRIPTION OF THE DRAWINGS

In order to provide a clearer illustration of various embodiments of the present disclosure or technical solutions in conventional technology, the drawings used in the description of the disclosed embodiments or the conventional technology are briefly described below. The following drawings are merely embodiments of the present disclosure. Other drawings may be obtained based on the disclosed drawings by those skilled in the art without creative efforts.

DETAILED DESCRIPTION

For the purpose of reference and clarity, the summary of the technical terms, acronyms, or abbreviations used in the present disclosure are explained as follows.

Activity: Activity is one of the basic and common four components, i.e., Activity, Service, Content Provider, and Broadcast Receiver, in Android. Activity is an app component that provides a screen interface, with which the user can interact to accomplish a task. All operations of Activity are closely related with the user. Activity is a component for interacting with the user.

Technical solution according to various disclosed embodiments is described below with reference to the drawings. The described embodiments are merely some of embodiments of the present disclosure, but not all embodiments of the present disclosure. Other embodiments obtained based on the disclosed embodiments by those skilled in the art without creative efforts are within the scope of the present disclosure.

Figure 1:
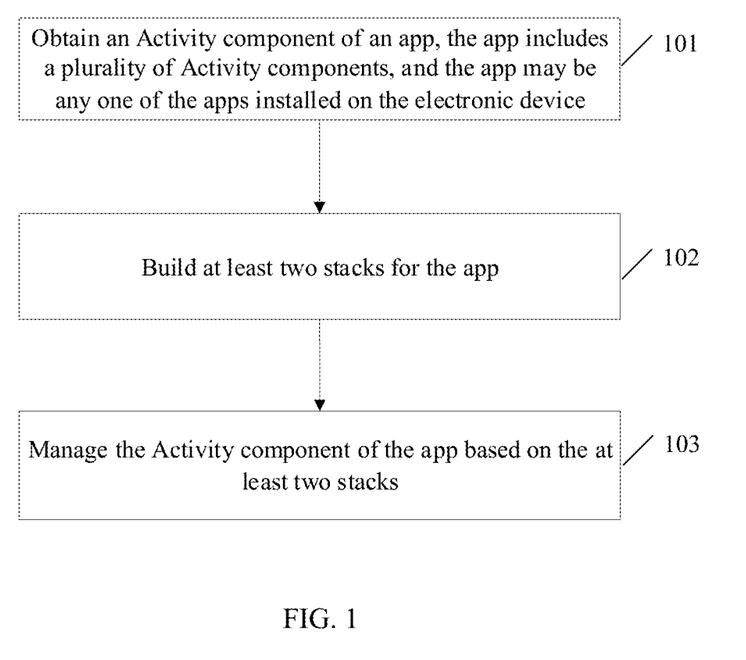
FIG. 1 is a flow chart of a control method according to an embodiment of the present disclosure.

In one aspect, the present disclosure provides a control method. The control method can be implemented in, but is not limited to, an electronic device, such as a smart phone, a tablet computer, or the like. FIG. 1 shows a flow chat of the control method according to an embodiment.

At 101, an Activity component of an app is obtained. The app includes a plurality of Activity components, and the app may be any one of the apps installed on the electronic device. That is, at 101, one of the Activity components of the app is obtained.

In some embodiments, the app may be any one of the apps, such as a WeChat, a QQ, or the like, installed on the electronic device. The app includes the plurality of Activity components. After an Activity component of the app is started, a screen interface is provided on the electronic device display screen for interacting with the user to accomplish a task. Through executing the corresponding operation on the app, the user may close an Activity component, or start an Activity component, or switch between the Activity components. As such, the interface of the desired Activity component can be brought forward by the switch operation.

In some embodiments, based on the Activity Manager Service (AMS), the Activity component that is triggered and generated by the user's operation on the app can be obtained.

At 102, at least two stacks are built for the app.

In the conventional technology, only one stack is built for an app and based on the one stack, the Activity components of the app are managed. In contrast, according to the present disclosure, at least two stacks are built for an app, and Activity components of the app are managed based on the at least two stacks. In some embodiments, the at least two stacks are built for the app based on the obtained Activity component of the app. As such, the problem in the conventional technology that two or more Activity components, for example, the article window and the chat window, cannot be opened in the app at the same time, can be solved.

Based on a preset rule, at least two stacks can be built for the app. For example, assuming that the app contains n Activity components (n being an integer), a main stack and a secondary stack may be built for the app based on the preset rule. Each stack contains corresponding number of Activity components that satisfy the stack rule of the corresponding stack. Accordingly, the main stack and the secondary stack can manage their respective Activity components. In some embodiments, based on the preset rule, more than two stacks may be built for the app such that Activity components of the app can be managed based on the more than two stacks. The disclosure is not limited thereto.

At 103, the Activity components of the app are managed based on the at least two stacks.

Based on the at least two stacks that have been built for the app, the Activity components of the app can be managed. For example, for an Activity component being currently displayed in the front, also referred to as "forwardly displayed," on the display screen, a rollback management can be performed based on the stack corresponding to the forwardly displayed Activity component, to determine what Activity component of the app to roll back to when a rollback operation is performed. In some embodiments, according to different stacks of the at least two stacks that have been built, different Activity components in the different stacks can be opened and displayed at the same time. As such, the user can use different Activity components at the same time.

Therefore, in the control method provided by the present disclosure, an Activity component of the app is obtained. The app includes a plurality of Activity components. The app may be any one of the apps installed on the electronic device. At least two stacks are built for the app. Based on the at least two stacks, the Activity components of the app can be managed. Since the present disclosure is based on at least two stacks to manage the Activity components of the app, the uses of the Activity components in different stacks are independent of each other and do not affect each other. As such, at least two Activity components can be used simultaneously. Therefore, the present disclosure can solve the problem of the existing social apps that article interface and chatting interface cannot be opened at the same time, and further enhance the friendliness of the app.

Figure 2:
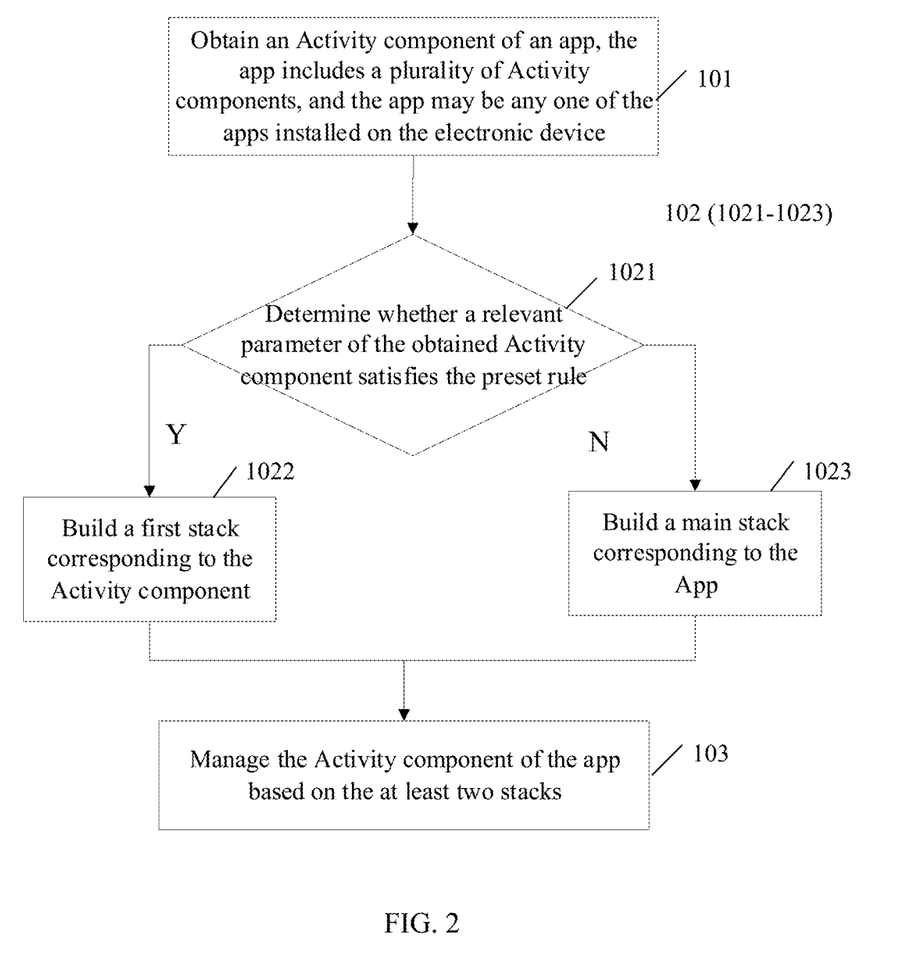
FIG. 2 is a flow chart of a control method according to another embodiment of the present disclosure.

FIG. 2 shows a flow chart of a control method according to another embodiment. The processes at 101 and 103 shown in FIG. 2 are similar to the processes at 101 and 103 in FIG. 1, and thus detailed description thereof is omitted. As shown in FIG. 2, building the at least two stacks for the app (102 in FIG. 2) can be achieved through the following process.

At 1021, whether a relevant parameter of the obtained Activity component satisfies the preset rule is determined.

The relevant parameter of an Activity component may include identification information for identifying the Activity component. In some embodiments, the identification information of a component may include component-class-name and application-package-name of the app to which the component belongs. As such, through the identification information of an Activity component, to which app the Activity component belongs and which one of the Activity components of the app is the Activity component can be determined.

The preset rule may be preset, indicating information for building stacks for the components. The indicating information can be used to indicate which one of the Activity components of the app needs a secondary stack, i.e., a stack independent of the main stack of the app. As such, based on the app's main stack and the stack independent of the main stack, the device can manage the Activity components of the two stacks independently.

Furthermore, the indicating information may include the relevant parameter information corresponding to at least one Activity component, such as the identification information of the at least one Activity component. As such, based on the indicating information, the stack independent of the main stack of the app can be built for the at least one Activity component indicated by the indicating information.

When the preset rule is the indicating information, if the relevant parameter of an Activity component, such as the identification information of the Activity component, is included in the indicating information, it indicates that the relevant parameter of the Activity component satisfies the preset rule. Otherwise, if the relevant parameter of the Activity component is not included in the indicating information, it indicates that the relevant parameter of the Activity component does not satisfy the preset rule.

At 1022, based on a first determination result that indicates the relevant parameter of the obtained Activity component satisfies the preset rule, a first stack corresponding to the Activity component is built.

If the relevant parameter of the obtained Activity component satisfies the preset rule, for example, if the identification information of the obtained Activity component is contained in the indicating information, the first stack corresponding to the obtained Activity component is built. The stack is independent of the main stack of the app, and can be referred as the secondary stack. The obtained Activity component can be managed based on the first stack. As such, the management of the Activity component(s) in the first stack and the management of the Activity component(s) in the main stack are independent of each other and do not affect each other.

At 1023, based on a second determination result that indicates the relevant component of the obtained Activity component does not satisfy the preset rule, the main stack corresponding to the app is built.

If the relevant parameter of the obtained Activity component does not satisfy the preset rule, for example, if the identification information of the obtained Activity component is not contained in the indicating information, the main stack corresponding to the app can be built.

The main stack refers to a stack for the entire app, and the first stack, i.e., the secondary stack, refers to a stack for the Activity component(s) of the app that require an independent stack for management. Except for the Activity component(s) that are determined according to a rule to require the independent stack for management, other Activity components in the app can be managed based on the main stack of the app during the application process. The rule may be, for example, the preset rule described above, or may be a rule formed by combining other factor(s) (such as a boot source of the Activity component) based on the preset rule.

Figure 3:
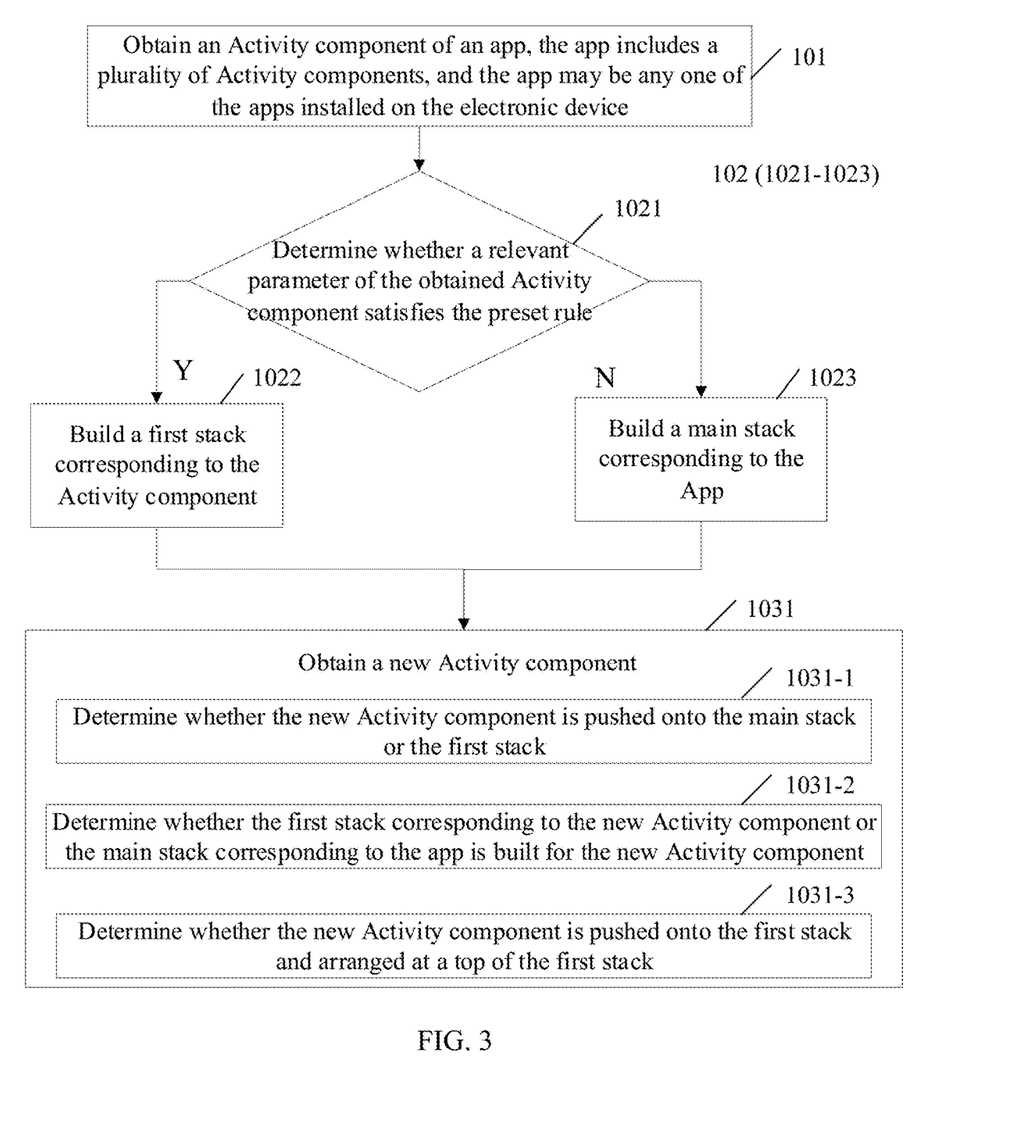
FIG. 3 is a flow chart of a control method according to another embodiment of the present disclosure.

FIG. 3 shows a flow chart of a control method according to another embodiment. The processes at 101, 1021, 1022, and 1023 shown in FIG. 3 are similar to the processes at 101, 1021, 1022, and 1023 in FIG. 2, and thus detailed description thereof is omitted. As shown in FIG. 3, managing the Activity components of the app based on the at least two stacks (103 in FIG. 3) can be achieved by the following process.

At 1031, a new Activity component is obtained. In some embodiments, at 1031-1, whether the new Activity component is pushed onto the main stack or the first stack is determined based on a boot source of the new Activity component and the preset rule. In some embodiments, at 1031-2, whether the first stack corresponding to the new Activity component or the main stack corresponding to the app is built for the new Activity component is determined based on the boot source of the new Activity component and the preset rule. In some embodiments, at 1031-3, whether the new Activity component is pushed onto the first stack and arranged at a top of the first stack is determined based on the boot source of the new Activity component and the preset rule.

In some embodiments, the new Activity component may be a component triggered to start by executing a corresponding operation by a user on an interface of a forwardly displayed Activity component of an app. For example, in a WeChat article interface (corresponding to an Activity component) being forwardly displayed, an operation to open an article will start the Activity component corresponding to the article. In some other embodiments, the new Activity component may be a component triggered to start by executing a corresponding operation on a main interface of the app. For example, in the main interface of WeChat, an operation to open Moments will start the Activity component corresponding to Moments. As another example, an operation to open a chat window with a contact in the main interface will start the Activity component corresponding to the chat window.

In some embodiments, the new Activity component may also be obtained based on the Activity Manager Service (AMS).

The boot source of the new Activity component is a portion of the app based on which the Activity component is started. The boot source may be the interface provided by the Activity component of the app, or may be the main interface of the app.

After the new Activity component is obtained, building the stack for the new Activity component or pushing the new Activity component onto the stack can be managed.

In some embodiments, based on the boot source of the new Activity component and the preset rule, whether the new Activity component is pushed onto the main stack or the first stack is determined.

Specifically, assume that at least two stacks are currently available for the app, for example, assume the first stack and the main stack have been built. If the relevant parameter of the new Activity component satisfies the preset rule, for example, the identification information is contained in the indicating information, the new Activity component can be determined to be pushed onto the first stack. If the relevant parameter of the new Activity component does not satisfy the preset rule, but the boot source of the new Activity component satisfies the preset rule, then it can be determined that the boot source of the new Activity component is in the first stack, i.e., the new Activity component is booted from the first stack. In this situation, the new Activity component can also be pushed onto the first stack. If the relevant parameter of the new Activity component does not satisfy the preset rule, and the boot source of the new Activity component is in the main stack, the new Activity component is pushed onto the main stack.

In some embodiments, based on the boot source of the new Activity component and the preset rule, whether the first stack corresponding to the new Activity component or the main stack corresponding to the app is built for the new Activity component is determined.

When, based on the boot source of the new Activity component and the preset rule, the new Activity component is determined to be pushed onto the first stack, if the first stack has not been built or is closed, the first stack corresponding to the new Activity component is built. Similarly, when, based on the boot source of the new Activity component and the preset rule, the new Activity component is determined to be pushed onto the main stack, if the main stack has not been built, the main stack corresponding to the app is built so that the new Activity component can be pushed onto the main stack.

In some embodiments, based on the boot source of the new Activity component and the preset rule, whether the new Activity component is pushed onto the first stack and arranged at the top of the first stack is determined.

When, based on the boot source of the new Activity component and the preset rule, the new Activity component is determined to be pushed onto the first stack, according to the First In First Out (FIFO) characteristics of the stack, the new Activity component is pushed onto the top of the first stack. Similarly, if the new Activity component is determined to be pushed onto the main stack, according to the characteristics of the stack, the new Activity component is pushed onto the top of the main stack.

In some embodiments, after the new Activity component is obtained, through building the stack for the new Activity component or pushing the new Activity component onto the stack, all the Activity components that have been started can be finally pushed onto at least two different stacks, respectively. Therefore, support can be provided for managing the Activity components of the app based on at least two different stacks.

Figure 4:
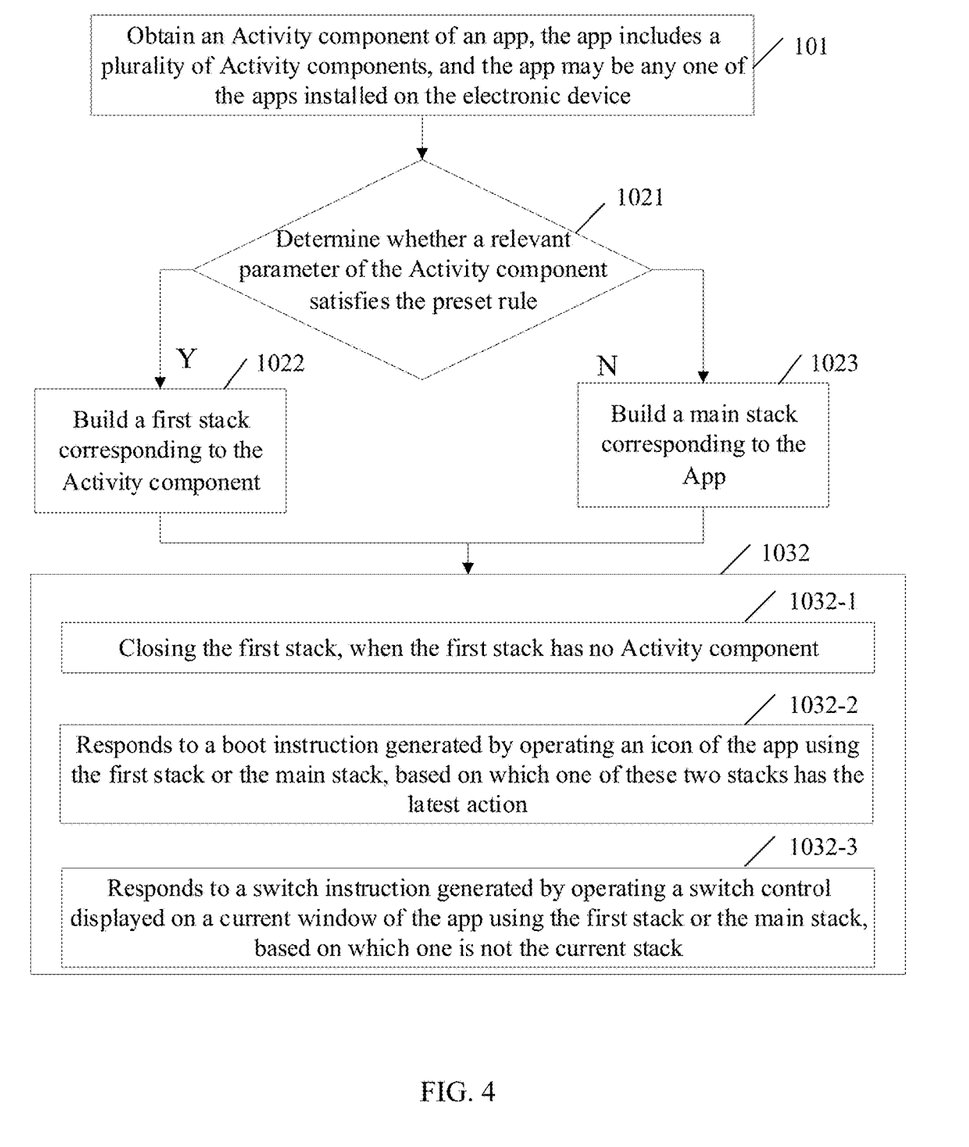
FIG. 4 is a flow chart of a control method according to another embodiment of the present disclosure.

FIG. 4 shows a flow chart of a control method according to another embodiment. The processes at 101, 1021, 1022, and 1023 shown in FIG. 4 are similar to the processes at 101, 1021, 1022, and 1023 in FIG. 2, and thus detailed description thereof is omitted. As shown in FIG. 4, managing the Activity components of the app based on the at least two stacks (103 in FIG. 4) can be achieved by the following process.

In some embodiments, at 1032-1, when the first stack has no Activity component, the first stack is closed. In some embodiments, at 1032-2, a boot instruction generated by operating an icon of the app is responded to using the first stack or the main stack, based on which one of these two stacks has the latest action. In some embodiments, at 1032-3, a switch instruction generated by operating a switch control displayed on a current window of the app is responded to using the first stack or the main stack, based on which one is not the current stack.

As described above, when an Activity component of the app is started, the first stack corresponding to the Activity component or the main stack corresponding to the app can be built, or the Activity component can be pushed onto the first stack or the main stack, based on the boot source of the Activity component and the preset rule. Accordingly, when the Activity component is closed, for example, the Activity component corresponding to a WeChat article is closed, the Activity component can be popped off the stack to which the Activity component belonged, for example, the Activity component can be popped off the first stack, etc. When all Activity components in a stack are popped off the stack, the stack becomes an empty stack. In this situation, the stack with no Activity components can be closed. Accordingly, for the first stack and the main stack built for the app, when the first stack has no Activity components, the first stack can be closed; and when the main stack has no Activity components, the main stack can be closed.

Closing the stack may include deleting the stack or destroying the stack. When a stack, for example, the first stack or the main stack, is closed, and an Activity component of the app is subsequently restarted and needs to be pushed onto the first stack or the main stack, the first stack corresponding to the started Activity component or the main stack corresponding to the app can be built dynamically for the started Activity component. As such, pushing the Activity component onto the corresponding stack can be achieved.

That is, in the present disclosure, the process of managing Activity components of an app according to at least two stacks is dynamic. For example, according to the actual start or exit event of the Activity component, the management operation, such as building the stack, pushing onto the stack, popping the stack, closing the stack, or the like, can be performed on the Activity component. When an Activity component is closed and popped off the stack, the system can perform the rollback management on the stack to which the Activity component belonged. In some embodiments, the new Activity component on the top of the stack, where the old Activity component is popped off, can be regarded as the current Activity component to be displayed on the interface.

In the process of starting and using an app, for example, in the process of starting and using an Activity component of the app, the relatively common scenario includes calling another app to use without exiting an Activity component of the current app. Thus, the interface of the Activity component currently used in the app that is not exited can be rolled back, i.e., hidden. When the user needs to re-use the app that is not exited, the app can be called by performing operation on the icon of the app.

For the above application scenario, a user may have a greater need for continuous use of the Activity component recently used and hidden in the app. Therefore, in the present disclosure, when the boot instruction generated by operating the icon of the app is obtained, the boot instruction is responded to based on one of the first stack or the main stack that has the latest action. The stack that has the latest action is the stack corresponding to the most recently used Activity component in the app. As such, by responding to the boot instruction based on one of the first stack or the main stack that has the latest action, the app is allowed to restore the most recently used Activity component for the user to continue to use.

Figure 5:
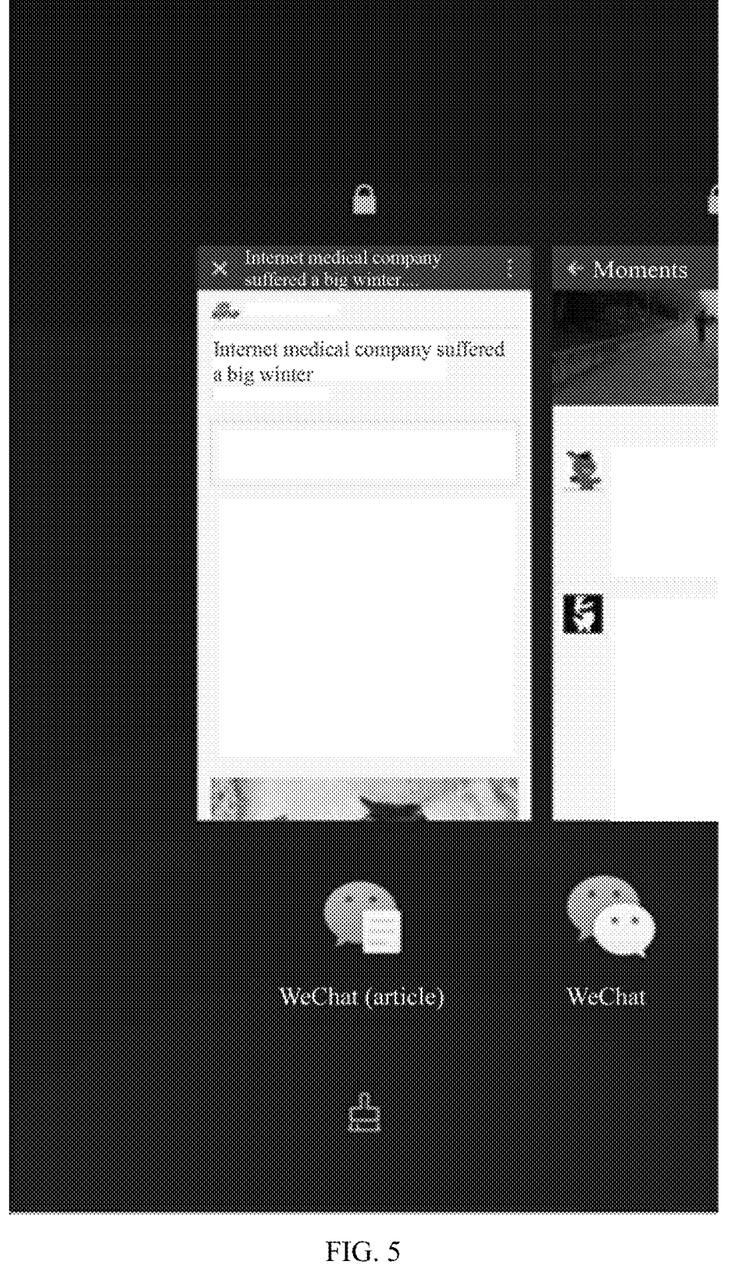
FIG. 5 is a schematic diagram of an interface on which different Activity components are simultaneously displayed in a split-screen mode according to embodiments of the present disclosure.

In the present disclosure, Activity components of an app are managed based on at least two stacks, different Activity components in different stacks can be opened and displayed at the same time. For example, different Activity components in the main stack and the first stack can be opened and displayed at the same time. Managements of the Activity components in different stacks are independent of each other and do not affect each other. FIG. 5 shows a split-screen mode used to simultaneously display different Activity components of different stacks. In practical applications, the user can perform the corresponding operation to display different Activity components in different stacks on the split-screen at the same time. On this basis, through performing a corresponding selection operation, the user can select the desired Activity component for use from the multiple interfaces of the Activity components displayed simultaneously in the split-screen. As such, the problem in the conventional technology that two Activity components cannot be used at the same time can be solved.

Figure 6:
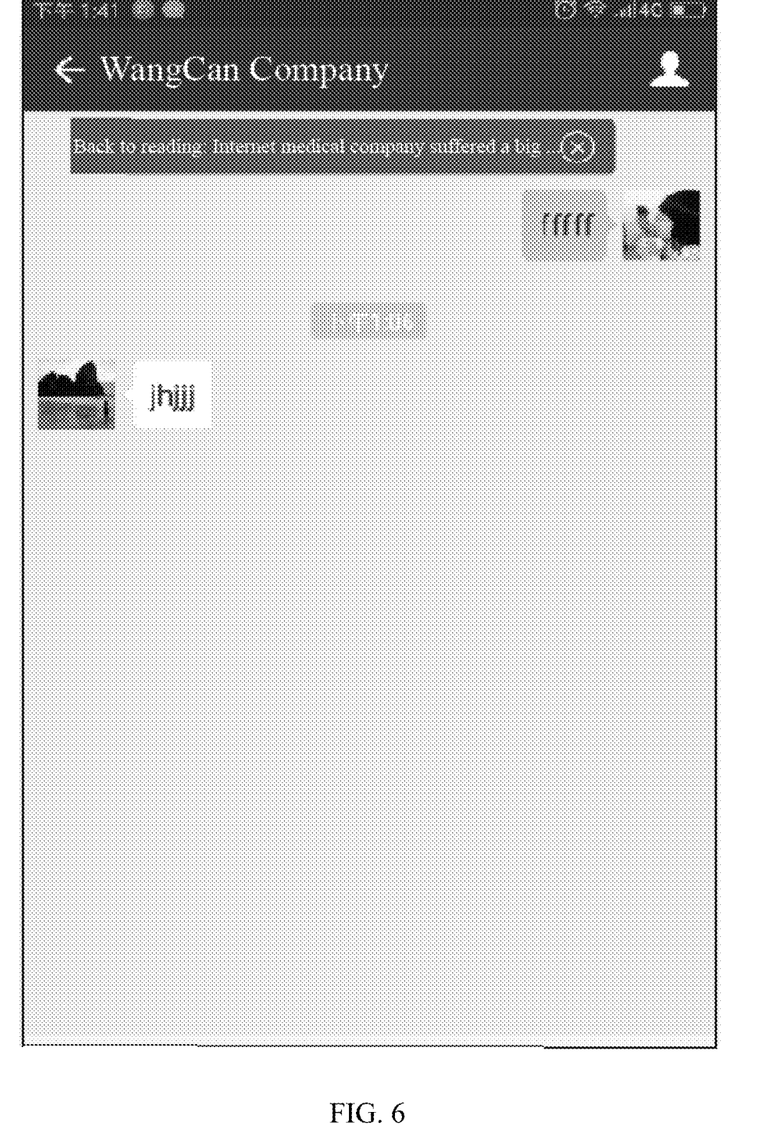
FIG. 6 is schematic diagram of setting a display switching control on a current Activity component interface.

In the present disclosure, based on the at least two stacks to manage the Activity components of the app, switching between different Activity components across the stacks can be realized. FIG. 6 shows an interface of a current Activity component. A display switch control in the form of, e.g., a floating window, can be set in the interface. The display switch control is used to indicate switching to an Activity component in a non-current stack. The non-current stack is a stack other than the stack to which the current Activity component belongs. The user can trigger a switch instruction by operating the display switch control. When receiving the switch instruction, the system responses to the switch instruction based on the non-current one of the main stack and the first stack. As such, directly switching from the interface of the current Activity component in the current stack to the interface of the Activity component at the top of the non-current stack can be realized.

Taking FIG. 6 as an example, assume the current interface shown in FIG. 6 is the interface of a chat component in the main stack of WeChat. The floating window in the interface is used to indicate the interface of an article component in the first stack of WeChat. Thus, when the user triggers the switch instruction by operating the floating window, the switch instruction can be responded to based on the non-current stack, i.e., the first stack, to directly switch from the current chatting interface in the main stack to the article interface in the first stack. As such, switching between different Activity components across the stacks can be realized. Unlike the conventional technology in which a series of complex operations are needed to switch from the chatting interface to the article interface, the friendliness of the app is enhanced according to the present disclosure.

When implementing the present disclosure, through modifying the framework code of the operating system of the electronic device in the conventional technology in advance, the stacks of apps can be managed on the bottom layer/physical layer of the system. The specific implementation of managing Activity components of an app based on at least two stacks can be realized. As such, the drawbacks of managing Activity components of the app on the application layer based on one stack in the conventional technology can be avoided.

Figure 7:
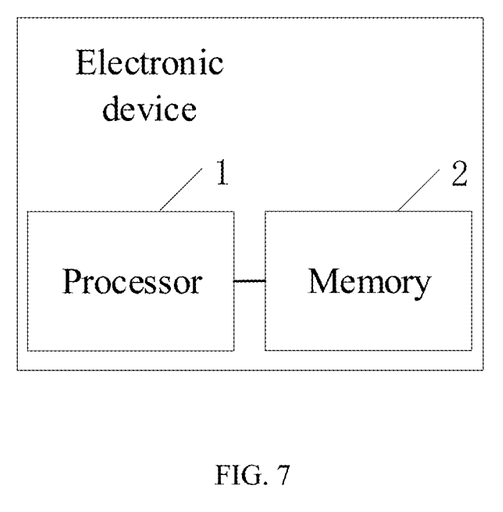
FIG. 7 is a structural diagram of an electronic device according to an embodiment of the present disclosure.

The present disclosure also provides an electronic device. The electronic device may be, but is not limited to, a smart phone, a tablet computer, or the like. FIG. 7 shows a structural diagram of an electronic device according to an embodiment. The electronic device includes a processor 1 and a memory 2.

The memory 2 is configured to store a computer program.

The processor 1 is configured to execute the computer program and to perform a method consistent with the disclosure, such as one of the examples of method described above.

In some embodiments, the processor 1 may obtain an activity component of an app. The app includes a plurality of Activity components, and the app may be any one of the apps installed on the electronic device.

The processor 1 may build at least two stacks for the app.

Based on the at least two stacks, the processor 1 may manage Activity components of the app.

In some embodiments, the app may be any one of the apps, such as a WeChat, a QQ, or the like, installed on the electronic device. The app includes the plurality of Activity components. After an Activity component of the app is started, a screen interface is provided on the electronic device display screen for interacting with the user to accomplish a task. Through executing the corresponding operation on the app, the user may close an Activity component, or start an Activity component, or switch between the Activity components. As such, the interface of the desired Activity component can be brought forward by the switch operation.

In some embodiments, based on the Activity Manager Service (AMS), the processor 1 can obtain the Activity component that is triggered and generated by the user's operation on the app.

In the conventional technology, only one stack is built for an app and based on the one stack, the Activity components of the app are managed. In contrast, according to the present disclosure, the processor 1 can build at least two stacks for an app, and manage Activity components of the app based on the at least two stacks. As such, the problem in the conventional technology that two or more Activity components, for example, the article window and the chat window, cannot be opened in the app at the same time, can be solved.

Based on a preset rule, the processor 1 can build at least two stacks for the app. For example, assuming that the app contains n Activity components (n being an integer), a main stack and a secondary stack may be built for the app based on the preset rule. Each stack contains corresponding number of Activity components that satisfy the stack rule of the corresponding stack. Accordingly, the main stack and the secondary stack can manage their respective Activity components. In some embodiments, based on the preset rule, more than two stacks may be built for the app such that Activity components of the app can be managed based on the more than two stacks. The disclosure is not limited thereto.

Based on the at least two stacks that have been built for the app, the processor 1 can manage the Activity components of the app. For example, for an Activity component being currently displayed in the front, also referred to as "forwardly displayed," on the display screen, a rollback management can be performed based on the stack corresponding to the forwardly displayed Activity component, to determine what Activity component of the app to roll back to when a rollback operation is performed. In some embodiments, according to different stacks of the at least two stacks that have been built, different Activity components in the different stacks can be opened and displayed at the same time. As such, the user can use different Activity components at the same time.

Therefore, the electronic device provided by the present disclosure can obtain an Activity component of the app. The app includes a plurality of Activity components. The app may be any one of the apps installed on the electronic device. At least two stacks are built for the app. Based on the at least two stacks, the Activity components of the app can be managed. Since the present disclosure is based on at least two stacks to manage the Activity components of the app, the uses of the Activity components in different stacks are independent of each other and do not affect each other. As such, at least two Activity components can be used simultaneously. Therefore, the present disclosure can solve the problem of the existing social apps that article interface and chatting interface cannot be opened at the same time, and further enhance the friendliness of the app.

The processor 1 building at least two stacks for the app can be achieved through the following process.

The processor 1 determines whether a relevant parameter of the obtained Activity component satisfies the preset rule. Based on a first determination result that indicates the relevant parameter of the obtained Activity component satisfies the preset rule, the processor 1 builds a first stack corresponding to the Activity component. Based on a second determination result that indicates the relevant component of the obtained Activity component does not satisfy the preset rule, the processor 1 builds the main stack corresponding to the app.

The relevant parameter of an Activity component may include identification information for identifying the Activity component. In some embodiments, the identification information of a component may include component-class-name and application-package-name of the app to which the component belongs. As such, through the identification information of an Activity component, to which app the Activity component belongs and which one of the Activity components of the app is the Activity component can be determined.

The preset rule may be preset indicating information for building stacks for the components. The indicating information can be used to indicate which ones of the Activity components of the app need a secondary stack, i.e., a stack independent of the main stack of the app. As such, based on the app's main stack and the stack independent of the main stack, the device can manage the Activity components of the two stacks independently.

Furthermore, the indicating information may include the relevant parameter information corresponding to at least one Activity component, such as the identification information of the at least one Activity component. As such, based on the indicating information, the stack independent of the main stack of the app can be built for the at least one Activity component indicated by the indicating information.

When the preset rule is the indicating information, if the relevant parameter of an Activity component, such as the identification information of the Activity component, is included in the indicating information, it indicates that the relevant parameter of the Activity component satisfies the preset rule. Otherwise, if the relevant parameter of the Activity component is not included in the indicating information, it indicates that the relevant parameter of the Activity component does not satisfy the preset rule.

If the relevant parameter of the obtained Activity component satisfies the preset rule, for example, if the identification information of the obtained Activity component is contained in the indicating information, the first stack corresponding to the obtained Activity component is built. The stack is independent of the main stack of the app, and can be referred as the secondary stack. The obtained Activity component can be managed based on the first stack. As such, the management of the Activity component(s) in the first stack and the management of the Activity component(s) in the main stack are independent of each other and do not affect each other. If the relevant parameter of the obtained Activity component does not satisfy the preset rule, for example, if the identification information of the obtained Activity component is not contained in the indicating information, the main stack corresponding to the app can be built.

The main stack refers to a stack for the entire app, and the first stack, i.e., the secondary stack, refers to a stack for the Activity component(s) of the app that require an independent stack for management. Except for the Activity component(s) that are determined according to a rule to require the independent stack for management, other Activity components in the app can be managed based on the main stack of the app during the application process. The rule may be, for example, the preset rule described above, or may be a rule formed by combining other factor(s) (such as a boot source of the Activity component) based on the preset rule.

The processor 1 managing the Activity components of the app based on the at least two stacks can be achieved by the following process.

The processor 1 obtains a new Activity component. In some embodiments, whether the new Activity component is pushed onto the main stack or the first stack is determined based on a boot source of the new Activity component and the preset rule. In some embodiments, whether the first stack corresponding to the new Activity component or the main stack corresponding to the app is built for the new Activity component is determined based on the boot source of the new Activity component and the preset rule. In some embodiments, whether the new Activity component is pushed onto the first stack and arranged at a top of the first stack is determined based on the boot source of the new Activity component and the preset rule.

In some embodiments, the new Activity component may be a component triggered to start by executing a corresponding operation by a user on an interface of a forwardly displayed Activity component of an app. For example, in a WeChat article interface (corresponding to an Activity component) being forwardly displayed, an operation to open an article will start the Activity component corresponding to the article. In some other embodiments, the new Activity component may be a component triggered to start by executing a corresponding operation on a main interface of the app. For example, in the main interface of WeChat, an operation to open Moments will start the Activity component corresponding to Moments. As another example, an operation to open a chat window with a contact in the main interface will start the Activity component corresponding to the chat window.

In some embodiments, the new Activity component may also be obtained based on the Activity Manager Service (AMS).

The boot source of the new Activity component is a portion of the app based on which the Activity component is started. The boot source may be the interface provided by the Activity component of the app, or may be the main interface of the app.

After the new Activity component is obtained, building the stack for the new Activity component or pushing the new Activity component onto the stack can be managed.

In some embodiments, based on the boot source of the new Activity component and the preset rule, whether the new Activity component is pushed onto the main stack or the first stack is determined.

Specifically, assume that at least two stacks are currently available for the app, for example, assume the first stack and the main stack have been built. If the relevant parameter of the new Activity component satisfies the preset rule, for example, the identification information is contained in the indicating information, the new Activity component can be determined to be pushed onto the first stack. If the relevant parameter of the new Activity component does not satisfy the preset rule, but a component of the boot source of the new Activity component satisfies the preset rule, then it can be determined that the boot source of the new Activity component is in the first stack, i.e., the new Activity component is booted from the first stack. In this situation, the new Activity component can also be pushed onto the first stack. If the relevant parameter of the new Activity component does not satisfy the preset rule, and the boot source of the new Activity component is in the main stack, the new Activity component is pushed onto the main stack.

In some embodiments, based on the boot source of the new Activity component and the preset rule, whether the first stack corresponding to the new Activity component or the main stack corresponding to the app is built for the new Activity component is determined.

When, based on the boot source of the new Activity component and the preset rule, the new Activity component is determined to be pushed onto the first stack, if the first stack has not been built or is closed, the first stack corresponding to the new Activity component is built. Similarly, when, based on the boot source of the new Activity component and the preset rule, the new Activity component is determined to be pushed onto the main stack, if the main stack has not been built, the main stack corresponding to the app is built so that the new Activity component can be pushed onto the main stack.

In some embodiments, based on the boot source of the new Activity component and the preset rule, whether the new Activity component is pushed onto the first stack and arranged at the top of the first stack is determined.

When, based on the boot source of the new Activity component and the preset rule, the new Activity component is determined to be pushed onto the first stack, according to the First In First Out (FIFO) characteristics of the stack, the new Activity component is pushed onto the top of the first stack. Similarly, if the new Activity component is determined to be pushed onto the main stack, according to the characteristics of the stack, the new Activity component is pushed onto the top of the main stack.

In some embodiments, after the new Activity component is obtained, through building the stack for the new Activity component or pushing the new Activity component onto the stack, all the Activity components that have been started can be finally pushed onto at least two different stacks, respectively. Therefore, support can be provided for managing the Activity components of the app based on at least two different stacks.

The processor 1 managing the Activity components of the app based on the at least two stacks can be achieved by the following process.

In some embodiments, when the first stack has no Activity component, the processor 1 closes the first stack. In some embodiments, the processor 1 responds to a boot instruction, which is generated by operating an icon of the app, using the first stack or the main stack, based on which one of these two stacks has the latest action. In some embodiments, the processor 1 responds to a switch instruction generated by operating a switch control, which is displayed on a current window of the app, using the first stack or the main stack, based on which one of these two stacks is not the current stack.

As described above, when an Activity component of the app is started, the first stack corresponding to the Activity component or the main stack corresponding to the app can be built, or the Activity component can be pushed onto the first stack or the main stack, based on the boot source of the Activity component and the preset rule. Accordingly, when the Activity component is closed, for example, the Activity component corresponding to a WeChat article is closed, the Activity component can be popped off the stack to which the Activity component belonged, for example, the Activity component can be popped off the first stack, etc. When all Activity components in a stack are popped off the stack, the stack becomes an empty stack. In this situation, the stack with no Activity components can be closed. Accordingly, for the first stack and the main stack built for the app, when the first stack has no Activity components, the first stack can be closed; and when the main stack has no Activity components, the main stack can be closed.

Closing the stack may include deleting the stack or destroying the stack. When a stack, for example, the first stack or the main stack, is closed, and an Activity component of the app is subsequently restarted and needs to be pushed onto the first stack or the main stack, the first stack corresponding to the started Activity component or the main stack corresponding to the app can be built dynamically for the started Activity component. As such, pushing the Activity component onto the corresponding stack can be achieved.

That is, in the present disclosure, the process of managing Activity components of an app according to at least two stacks is dynamic. For example, according to the actual start or exit event of the Activity component, the management operation, such as building the stack, pushing onto the stack, popping the stack, closing the stack, or the like, can be performed on the Activity component. When an Activity component is closed and popped off the stack, the system can perform the rollback management on the stack to which the Activity component belonged. In some embodiments, the new Activity component on the top of the stack, where the old Activity component is popped off, can be regarded as the current Activity component to be displayed on the interface.

In the process of starting and using an app, for example, in the process of starting and using an Activity component of the app, the relatively common scenario includes calling another app to use without exiting an Activity component of the current app. Thus, the interface of the Activity component currently used in the app that is not exited can be rolled back, i.e., hidden. When the user needs to re-use the app that is not exited, the app can be called by performing operation on the icon of the app.

For the above application scenario, a user may have a greater need for continuous use of the Activity component recently used and hidden in the app. Therefore, in the present disclosure, when the boot instruction generated by operating the icon of the app is obtained, the boot instruction is responded to based on one of the first stack or the main stack that has the latest action. The stack that has the latest action is the stack corresponding to the most recently used Activity component in the app. As such, by responding to the boot instruction based on one of the first stack or the main stack that has the latest action, the app is allowed to restore the most recently used Activity component for the user to continue to use.

In the present disclosure, Activity components of an app are managed based on at least two stacks, different Activity components in different stacks can be opened and displayed at the same time. For example, different Activity components in the main stack and the first stack can be opened and displayed at the same time. Managements of the Activity components in different stacks are independent of each other and do not affect each other. FIG. 5 shows a split-screen mode used to simultaneously display different Activity components of different stacks. In practical applications, the user can perform the corresponding operation to display different Activity components in different stacks on the split-screen at the same time. On this basis, through performing a corresponding selection operation, the user can select the desired Activity component for use from the multiple interfaces of the Activity components displayed simultaneously in the split-screen. As such, the problem in the conventional technology that two Activity components cannot be used at the same time can be solved.

In the present disclosure, based on the at least two stacks to manage the Activity components of the app, switching between different Activity components across the stacks can be realized. FIG. 6 shows an interface of a current Activity component. A display switch control in the form of, e.g., a floating window, can be set in the interface. The display switch control is used to indicate switching to an Activity component in a non-current stack. The non-current stack is a stack other than the stack to which the current Activity component belongs. The user can trigger a switch instruction by operating the display switch control. When receiving the switch instruction, the system responses to the switch instruction based on the non-current one of the main stack and the first stack. As such, directly switching from the interface of the current Activity component in the current stack to the interface of the Activity component at the top of the non-current stack can be realized.

Taking FIG. 6 as an example, assume the current interface shown in FIG. 6 is the interface of a chat component in the main stack of WeChat. The floating window in the interface is used to indicate the interface of an article component in the first stack of WeChat. Thus, when the user triggers the switch instruction by operating the floating window, the switch instruction can be responded to based on the non-current stack, i.e., the first stack, to directly switch from the current chatting interface in the main stack to the article interface in the first stack. As such, switching between different Activity components across the stacks can be realized. Unlike the conventional technology in which a series of complex operations are needed to switch from the chatting interface to the article interface, the friendliness of the app is enhanced according to the present disclosure.

When implementing embodiments of the present disclosure, through modifying the framework code of the operating system of the electronic device in the conventional technology in advance, the stacks of apps can be managed on the bottom layer/physical layer of the system. The specific implementation of managing Activity components of an app based on at least two stacks can be realized. As such, the drawbacks of managing Activity components of the app on the application layer based on one stack in the conventional technology can be avoided.

Another embodiment of the present disclosure is to modify the kernel layer of an operating system (OS), i.e., to modify the Activity Manager Service, the Activity component, or the stack. As such, managing Activity components of an app based on at least two stacks can be realized. Direct switch from a chatting interface to an article interface of a same app by one step can be realized. Furthermore, switching to a previous reading position in the article interface can be realized. Therefore, multi-step switch and selection operations, which requires the user to remember all the steps of the switch and selection process, can be avoided. Because the modification is made on the kernel layer of the operating system, the present disclosure can manage any app, which is installed on the electronic device and is running on the current operation system, based on at least two stacks.

In the present specification, the embodiments are described in a gradual and progressive manner. Same or similar parts in the various embodiments may be described with reference to each other.

A method according to the embodiments of the disclosure can be realized by means of software plus a hardware platform, or can be realized by a hardware platform. Embodiments of the present disclosure can be implemented in the form of a software product stored in a storage medium (such as ROM, RAM, magnetic disc, or optical disc), which may include a number of instructions for enabling an electronic device, e.g., a mobile phone, a computer, a server, an air conditioner, or a network device, or the like, to perform a method consistent with the disclosure, such as one of the methods described above.

The terms "first," "second," "third," "fourth," or the like in the specification are merely used to distinguish an entity or an operation from another entity or operation, and are not intended to require or indicate that there is any such physical relationship or sequence between these entities or operations. In addition, the terms "including," "comprising," and variants thereof herein are open, non-limiting terminologies, which are meant to encompass a series of elements of processes, methods, items, or devices. Not only those elements, but also other elements that are not explicitly listed, or elements that are inherent to such processes, methods, items, or devices. In the absence of more restrictions, the elements defined by the statement "include a/an . . . " not preclude that other identical elements are included in the processes, methods, items, or devices that include the elements.

The embodiments disclosed herein are merely examples. Other applications, advantages, alternations, or modifications of, or equivalents to the disclosed embodiments are obvious to a person skilled in the art and are intended to be encompassed within the scope of the present disclosure.

What is claimed is:

1. A control method comprising:
building, through a processor of an electronic device, a main stack corresponding to an app, the app including a plurality of Activity components;
in response to determining that indication information of a first Activity component of the plurality of Activity components satisfies a preset rule, building, through the processor, a secondary stack for the first Activity component, wherein:
the indication information includes information of the app and information of the first Activity component, and
the preset rule indicates candidate Activity components corresponding to the secondary stack independent of the main stack; and
managing, through the processor, the plurality of Activity components based on at least two stacks including the main stack and the secondary stack.

2. The method according to claim 1, wherein building the main stack corresponding to the app includes:
determining, through the processor, whether indication information of a second Activity component of the plurality of Activity components satisfies the preset rule; and
building, through the processor, the main stack corresponding to the app in response to determining that the indication information of the second Activity component does not satisfy the preset rule.

3. The method according to claim 1, wherein building the secondary stack for the first Activity component includes:
determining, through the processor, whether the indication information of the first Activity component satisfies the preset rule.

4. The method according to claim 1, wherein managing the Activity components based on the at least two stacks includes:
obtaining, through the processor, a third Activity component of the plurality of Activity components; and
determining, through the processor, whether to push the third Activity component onto the main stack corresponding to the app or the secondary stack based on a boot source of the third Activity component and the preset rule.

5. The method according to claim 1, further comprising:
determining, through the processor, whether to build the main stack corresponding to the app or the secondary stack based on a boot source of one Activity component of the plurality of Activity components and preset rule.

6. The method according to claim 1, wherein managing the Activity components based on the at least two stacks includes:
obtaining, through the processor, a third Activity component of the plurality of Activity components; and
determining, through the processor, to push the third Activity component onto a stack top of the secondary stack based on a boot source of the third Activity component and the preset rule.

7. The method according to claim 1, wherein managing the Activity components based on the at least two stacks includes:
closing, through the processor, the secondary stack of the app in response to determining that no Activity component is in the secondary stack.

8. The method according to claim 1, wherein:
the app includes the main stack corresponding to the app and the secondary stack, and
managing the plurality of Activity components based on the at least two stacks includes responding, using one of the main stack or the secondary stack that has a latest action, to a boot instruction generated by operating an icon of the app.

9. The method according to claim 1, wherein:
the app includes the main stack corresponding to the app and the secondary stack, and
managing the plurality of Activity components based on the at least two stacks includes responding, using one of the main stack or the secondary stack that is not a current stack, to a switch instruction generated by a switch control displayed on a current window of the app.

10. The method according to claim 1, further comprising:
obtaining, through the processor and based on an Activity Manager Service, the first Activity component of the app that is triggered and generated by an operation on the app.

11. An electronic device comprising:
a memory storing a computer program; and
a processor coupled to the memory, wherein the processor executes the computer program to:
build a main stack corresponding to an app, the app including a plurality of Activity components;
in response to determining that indication information of a first Activity component of the plurality of Activity components satisfies a preset rule, build a secondary stack for the first Activity component, wherein:
the indication information includes information of the app and information of the first Activity component, and
the preset rule indicates candidate Activity components corresponding to the secondary stack independent of the main stack; and
manage the plurality of Activity components based on at least two stacks including the main stack and the secondary stack.

12. The electronic device according to claim 11, wherein the processor further executes the computer program to:
determine whether indication information of a second Activity component of the plurality of Activity components satisfies the preset rule; and
build the main stack corresponding to the app in response to determining that the indication information of the second Activity component does not satisfy the preset rule.

13. The electronic device according to claim 11, wherein the processor further executes the computer program to:
determine whether the indication information of the first Activity component satisfies the preset rule.

14. The electronic device according to claim 11, wherein the processor further executes the computer program to:

obtain a third Activity component of the plurality of Activity components; and determine whether to push the third Activity component onto the main stack corresponding to the app or the secondary stack based on a boot source of the third Activity component and the preset rule.

15. The electronic device according to claim 11, wherein the processor further executes the computer program to:

determine whether to build the main stack corresponding to the app or the secondary stack based on a boot source of one Activity component of the plurality of Activity components and the preset rule.

16. The electronic device according to claim 11, wherein the processor further executes the computer program to:

obtain a third Activity component of the plurality of Activity components; and determine to push the third Activity component onto a stack top of the secondary stack based on a boot source of the third Activity component and the preset rule.

17. The electronic device according to claim 11, wherein the processor further executes the computer program to:

close the secondary stack of the app in response to determining that no Activity component is in the secondary stack.

18. The electronic device according to claim 11, wherein:

the app includes the main stack corresponding to the app and the secondary stack, and the processor further executes the computer program to respond, using one of the main stack or the secondary stack that has a latest action, to a boot instruction generated by operating an icon of the app.

19. The electronic device according to claim 11, wherein:

the app includes the main stack corresponding to the app and the secondary stack, and the processor further executes the computer program to respond, using one of the main stack or the secondary stack that is not a current stack, to a switch instruction generated by a switch control displayed on a current window of the app.

20. The electronic device according to claim 11, wherein the processor further executes the computer program to:

obtain, based on an Activity Manager Service, the first Activity component of the app that is triggered and generated by an operation on the app.

* * * * *